United States Patent [19]

Uesaka et al.

[11] Patent Number: 4,674,886

[45] Date of Patent: Jun. 23, 1987

[54] DEVICE FOR MAKING FROZEN CONFECTIONS

[75] Inventors: Susumu Uesaka, Funabashi; Noriyuki Harada, Fuji, both of Japan

[73] Assignee: Nippon Light Metal Co. Ltd., Japan

[21] Appl. No.: 858,731

[22] Filed: May 2, 1986

Related U.S. Application Data

[63] Continuation of Ser. No. 686,897, Dec. 27, 1984, Pat. No. 4,586,826.

[30] Foreign Application Priority Data

Dec. 30, 1983 [JP] Japan .................................. 58-202653

[51] Int. Cl.[4] ............................................ B01F 15/06
[52] U.S. Cl. ..................................... 366/144; 366/143; 366/221; 366/231; 62/342; 62/353
[58] Field of Search ............... 366/143, 144, 148, 149, 366/309, 310, 221, 225, 231, 213, 220, 222, 227, 228, 229, 230, 231; 62/343, 353

[56] References Cited

U.S. PATENT DOCUMENTS 1,837,565 12/1931 McDougall ......................... 366/144
3,410,103 11/1968 Cornelius ........................... 366/144
3,452,555 7/1969 Thurman ............................. 62/342
3,952,538 4/1976 Warlick .............................. 366/144
3,958,968 5/1976 Hosaka .............................. 366/144
4,166,705 9/1979 Fronske ............................. 366/221
4,332,485 6/1982 Woodman ......................... 366/231
4,392,361 7/1983 Cavalli .............................. 366/309

Primary Examiner—Robert W. Jenkins
Attorney, Agent, or Firm—Eric P. Schellin

[57] ABSTRACT

An apparatus for making frozen confections including a double-walled vessel consisting of a concentric cylindrical inner and outer vessels each having an upper open end and defining an annular space therebetween for containing a cooling material. The said double-walled vessel is secured in a larger vessel, the bottom of which is supplied with driving means. A carrying means is rotatably mounted on said driving means and the double-walled vessel is mounted thereon and is rotated thereby. Said receptacle and said double-walled vessel is closed by a cover, the underside of which carries fixed paddles. When the cover is in place, the paddles extend into the inner vessel and remains stationary as the double-walled vessel is rotated.

12 Claims, 3 Drawing Figures

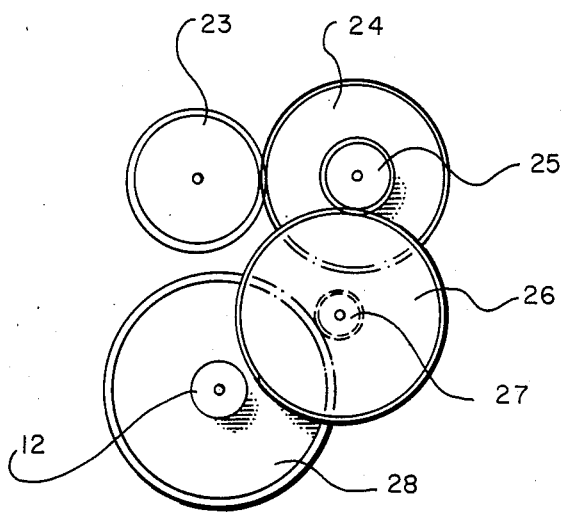
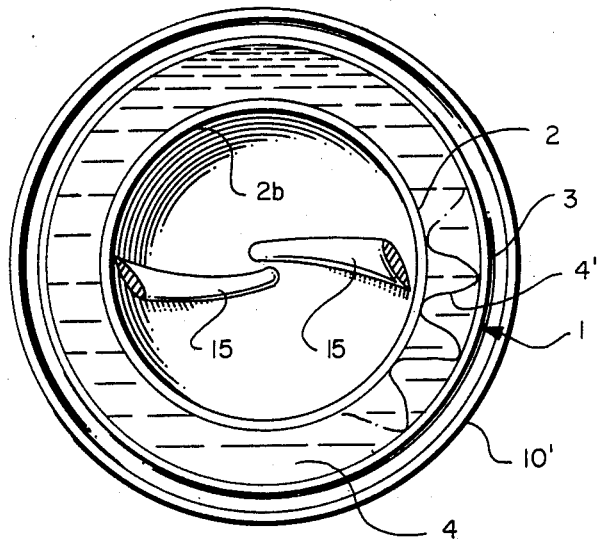

DEVICE FOR MAKING FROZEN CONFECTIONS

This application is a continuation of application Ser. No. 686,897, filed Dec. 27, 1984, now U.S. Pat. No. 4,586,826.

BACKGROUND OF THE INVENTION

The present invention relates to a device for making frozen confections such as ice cream and sherbet mainly at homes.

When frozen confections are made at homes, a larger bowl and a smaller bowl are usually used and ice pieces with an appropriate amount of salt added thereto are charged in the larger bowl and the smaller bowl is located on the ice pieces in which smaller bowl are appropriate amount of material for making frozen confections is charged. The material is manually agitated as it is frozen by the cold given by the ice pieces until the frozen confections are completed. With such a method, rapid and sufficient cooling of the material cannot be obtained so that the finished frozen confections are incomplete, thereby requiring a long time and a large amount of ice pieces until the frozen confections are completed.

In order to avoid the above difficulties and to provide a useful device for making frozen confections, the applicant has proposed a device as described in Japanese Utility Model Application No. 89868/1983.

The device described in the above application utilizes a double-walled vessel consisting of inner and outer vessel members each having an upper open end and a closed bottom with the upper ends hermetically sealed together to form sealed annular and bottom spaces between the walls of the inner and outer vessel members in which an appropriate amount of cold keeping agent is enclosed. Prior to making frozen confections, the double-walled vessel is preliminarily refrigerated in a refrigerator of the home-use type so as to give sufficient cold to the cold keeping agent. In use, the refrigerated double-walled vessel is taken out from the refrigerator and the material for making frozen confections is charged therein and agitated by the rotation of agitating blades located in the double-walled vessel which is stationarily held in a receptacle, thereby permitting the device to be repeatedly used. The agitating blades are rotatably mounted in a cover member attached to the upper open end of the receptacle and extend downwardly in the inner vessel member and manually rotated by a handle located outside the cover member and connected to the blades so as to agitate the material for making frozen confections. The above construction requires a relatively complicated and heaving cover member for rotatably supporting the handle.

SUMMARY OF THE INVENTION

It is an object of the present invention to provide a novel and useful device for making frozen confections developed on the basis of the above described device which is simple in construction, easy to manipulate and stable in operation, while cleaning and storage thereof are facilitated.

The above object is achieved in accordance with the characteristic feature of the present invention by providing a device for making frozen confections including a double-walled vessel consisting of a cylindrical inner vessel member for receiving therein the material for making frozen confections and a cylindrical outer vessel member each having an upper open end and a closed bottom, the upper ends of the inner and outer vessel members being hermetically sealed together to form an appropriate annular space and an appropriate bottom space communicating with the annular space between the cylindrical walls and the bottom walls thereof, respectively, a cold keeping agent of an appropriate amount enclosed within the annular and bottom spaces, a receptacle having an inner space adapted to receive therein the doublewalled vessel, a cover member detachably and non-rotatably mounted on the receptacle, and a plurality of agitating blades adapted to be arranged in the inner vessel member with the outer edge each of the agitating blades slidably contacting with the inner surface of the inner vessel member, the device being characterized by a rotatable table arranged within the inner space of the receptacle substantially intermediate the height thereof and adapted to detachably and non-rotatably mount thereon the double-walled vessel, and means arranged beneath said rotatable table for driving the same for rotation thereof, the agitating blades being adapted to be detachably and non-rotatably attached to the lower side of the cover member so as to extend downwardly in the inner vessel member toward the bottom thereof thereby causing relative rotation between the inner vessel member and the agitating blades. The inner vessel member may be applied with a resin coating on its inner surface in order to facilitate scraping of the frozen confections attached thereto by the agitating blades.

With this construction of the device of the present invention, since the double-walled vessel is rotated and the agitating blades are held stationarily, it is merely necessary to locate the double-walled vessel on the rotatable table thereby rendering the construction of the cover member to be simple while the manipulation of the device is facilitated and since the driving means of the heavy weight is located at the lower side of the device, the operation thereof is made stable Further, the receptacle preferably consists of an upper body member, a lower body member and a partition wall interposed therebetween and detachably connecting both the body members, the rotatable table being located above the partition wall, while the means for driving the rotatable table is located beneath the partition wall and detachably connected to the rotatable table through the partition wall, thereby permitting the upper body member to be detached together with the rotatable table from the lower body member together with the means for driving the rotatable table.

Thus, the cleaning of the upper body member is facilitated by detaching it from the lower body member, while the storage both of the body members is facilitated by separating both the body members from each other.

The means for driving the rotatable table preferably comprises an electric motor having reduction gear mechanism connected thereto which is adapted to be detachably connected to the rotatable table. Thus, it is easily used at homes by the electric power available at homes.

Further, the cover member is preferably formed with a central opening with which a transparent cap member is detachably fitted. Thus, the state of the material in the inner vessel member being frozen and agitated during the operation of the device can be readily observed through the transparent cap member for the inspection of the material being frozen, while the completed frozen confections can be readily taken out without detaching the cover member from the receptacle by merely detaching the cap member.

Further, the agitating blades preferably comprise a pair of diametrically opposed blades extending axially downwardly and radially symmetrically inwardly at the bottom of the inner vessel member in offset relationship to the center of the bottom thereof with the outer edge each of the blades slidably contacting with the cylindrical surface and the bottom surface of the inner vessel member.

The rotatable table is preferably of the cup-shaped configuration and provided with at least an inwardly extending projection at the inner surface of the upstanding wall of the cup-shaped configuration, while corresponding recess(es) are formed on the outer peripheral surface adjacent to the bottom of the outer vessel member, thereby permitting the double-walled vessel to be detachably and non-rotatably mounted on the rotatable table by fitting the inwardly extending projection(s) with the recess(es).

Further, the cover member is preferably provided with at least an inwardly extending projection in the inner surface of the downwardly extending peripheral wall thereof, while corresponding part-circular groove(s) are formed on the outer peripheral surface of the upper open end of the upper body member for receiving the projection(s) so as to prevent relative rotation between the cover member and the upper body member, axially extending groove(s) being formed in the outer peripheral surface of the upper end of the upper body member for allowing the inwardly extending projection(s) of the cover member to pass therethrough so as to permit the same to be received in the part-circular groove(s) on the outer peripheral surface of the upper open end of the upper body member.

BRIEF DESCRIPTION OF THE ACCOMPANYING DRAWINGS

Now preferred embodiment of the present invention will be described hereinafter with reference to the accompanying drawings illustrating the same, in which:

FIG. 2 is a plan view showing an example of the arrangement of the reduction gear mechanism of the driving means for the rotatable table; and FIG. 3 is a cross-sectional view taken along line III—III in FIG. 1.

DETAILED DESCRIPTION OF THE PREFERRED EMBODIMENT

Figure 1:
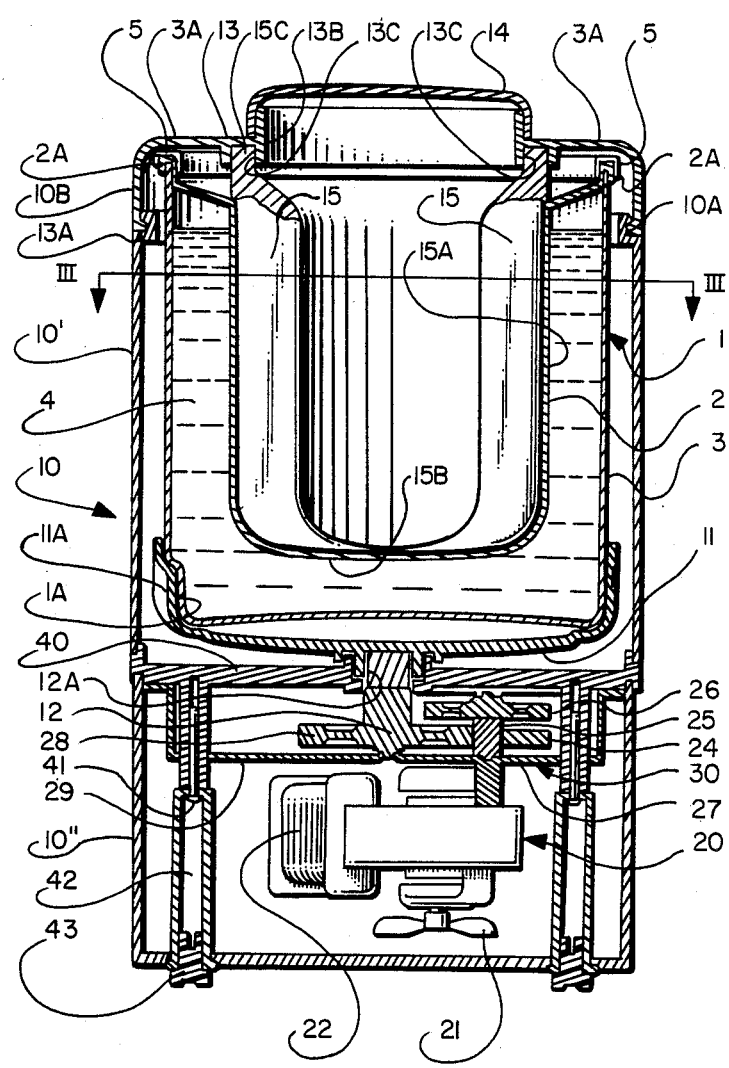
FIG. 1 is a longitudinal cross-sectional view showing the construction of the preferred embodiment of the device of the present invention.

The device for making frozen confections according to the present invention as shown in FIG. 1 comprises a double-walled vessel 1 consisting of a cylindrical inner vessel member 2 made of aluminum alloy by the deep drawing process and having an upper open end 2A and closed bottom for receiving therein the material for making frozen confections and a cylindrical outer vessel member 3 positioned around the inner vessel member 2 with an appropriate distance held therebetween and made of aluminum alloy by the deep drawing process and having an upper open end 3A and a closed bottom with the upper ends 2A, 3A of both the vessel members 2, 3 being hermetically sealed together by curling process so as to form an annular space between the cylindrical walls of the vessel members 2, 3 and a bottom space communicating with the annular space between the bottom walls thereof.

In order to improve a heat transfer between the vessel members and the cold keeping agent 4, especially between the inner vessel member and the cold keeping agent 4, a corrugated fin 4' (see FIG. 3) may be provided within the annular space, radially outer portions of which are attached to an inner surface of the outer vessel member and radially inner portions of which are attached to an outer surface of the inner vessel member. An appropriate amount of a cold keeping agent 4 is enclosed in the annular and bottom spaces. The curlingly sealed open ends 2A, 3A of the vessel members 2, 3 are covered by a resin packing 5 for protecting the sealed ends as well as for facilitating the handling of the double-walled vessel 1 which is refrigerated for making frozen confections. The inner vessel member may be applied with a resin coating such as Teflon coating on its inner surface in order to facilitate scraping of the frozen confection attached thereto. As to the cold keeping agent 4, water or carbonated water is used as the base with an appropriate amount of organic or inorganic substances such as alcohol, glycol, ethylene glycol and sodium chloride, for example, as well as an appropriate viscosity increasing agent being added thereto. The melting point of the cold keeping agent 4 is preferably set to be in the range of $-7°$ C. to $-17°$ C.

The receptacle 10 for locating the double-walled vessel 1 therein for making the frozen confections comprises a cylindrical upper body member 10' and a cylindrical lower body member 10" and a partition wall 40 interposed between the body members 10' and 10" and detachably connecting both the body members 10', 10".

In accordance with the characteristic feature of the present invention, a rotatable table 11 for detachably and non-rotatably supporting thereon the double-walled vessel 1 is provided in the upper body member 10' on the partition wall 40 and rotatably supported thereby and driving means adapted to be detachably connected to the rotatable table 11 through the partition wall 40 is provided in the lower body member 10" beneath the partition wall 40 for rotating the rotatable table 11, while an inverted cup-shaped cover member 13 is detachably and non-rotatably fitted with the upper end of the upper body member 10' so as to detachably and non-rotatably supporting a plurality of agitating blades 15 at the lower side of the cover member 13 for agitating the material for making frozen confections charged in the inner vessel member 2 when the inner vessel member 2 is rotated.

In order to detachably and non-rotatably supporting the double-walled vessel 1 on the rotatable table 11, the table 11 is shaped in the cup-form and at least an inwardly bulging projection 11A is formed in the cylindrical wall of the table 11, while corresponding recess(es) 1A are formed at the lower part of the cylindrical wall of the outer vessel member 3, thereby permitting the double-walled vessel 1 to be detachably and non-rotatably supported on the table 11 by engaging the recess(es) 1A with the projection(s) 11A.

The driving means for rotating the table 11 comprises an electric motor 20 having an electric coil 22 and a fan 21 for the cooling purpose and reduction gear mechanism 30 consisting of a pinion 23 connected to the shaft of the motor 20, a gear 24 meshing with the pinion 23, a pinion 25 integral with the gear 24, a gear 26 meshing with the pinion 25, a pinion 27 integral with the gear 26 and a gear 28 integral with a driving shaft 12 formed with a thread 12A adapted to be releasably engaged with the corresponding internal thread formed in the boss of the rotatable table 11 as shown in FIG. 2, for example. The sense of the threads is so determined that the threads are tightened when the table 11 is driven by the driving means. In order to rotatably support the shafts of the above described pinions and gears, a frame 29 provided with appropriate bearings is secured to the partition wall 40 at the lower side thereof by set screws 41 threaded into bosses formed on the partition wall 40. In the embodiment shown, the set screws 41 also secure sleeves 42 which are provided with rubber plugs 43 at the lower ends thereof so that they serve as the supporting legs. The reduction ratio of the reduction gear mechanism 30 is preferably so set with respect to the rotating speed of the motor 20 that the rotating speed of the shaft 12, i.e., the rotatable table 11, is rendered to be 60 rev/min, for example. The thread 12A may be replaced by splines engages with the corresponding mating splines formed in the boss of the table 11. The reduction gear mechanism 30 may be replaced by a belt transmission mechanism or a chain transmission mechanism and any combination of the reduction gear mechanism, the belt and chain transmission mechanisms.

In order to detachably and non-rotatably support the cover member 13 on the upper end of the upper body member 10', the cover member 13 is formed with an appropriate number of inwardly bulging projections 13A spaced an appropriate distance from each other at the lower edge of the cylindrical wall of the cover member 13, while the upper open end of the upper body member 10' is formed with corresponding number of part-circular grooves 10A correspondingly spaced from each other for receiving therein the projections 13A. In order to allow the projections 13A to be received into the grooves 10A from the upper side of the upper end of the upper body member 10', corresponding number of axial recesses 10B are formed in the outer surface of the upper end of the upper body member 10' corresponding spaced from each other so as to allow the passage therethrough of the projections 13A from the upper side.

Thus, the cover member 13 can be detachably and non-rotatably supported at the upper end of the upper body member 10' by passing the projections 13A from the upper side through the axial recesses 10B and engaging the same with the grooves 10A and rotating the cover member 10' until the rotation thereof is stopped by the abutment of the projections 13A against the ends of the grooves 10A.

In order to detachably and non-rotatably support the agitating blades 15 at the lower side of the cover member 13, a plurality of recesses 13C of non-circular cross-section such as square or rectangular cross-section corresponding to the number of the blades 15 are formed at the lower side of the cover member 13 circumferentially and equally spaced from each other, and each of the blades 15 is formed at the upper end thereof with an engaging portion 15C adapted to be detachably and non-rotatably fitted in the recesses 13C. Each of the blades 15, when the portion 15C is fitted with the recess 13C, extends axially downwardly and radially inwardly at the lower end with the axial outer edge 15A slidably contacting with the cylindrical surface of the inner vessel member 2 while the outer lower edge 15B slidably contacts with the bottom surface of the inner vessel member 2 with the innermost tip of the blade 15 being positioned in offset relationship to the center of the bottom of the inner vessel member 2. In the embodiment shown, a pair of diametrically oppositely and symmetrically arranged blades 15 are provided as seen in FIG. 3. In FIG. 3, the resin coating is indicated by reference numeral 2b.

In order to facilitate the observation of the material being frozen and agitated in the inner vessel member 2 as well as to facilitate the taking out of the completed frozen confections, the cover member 13 is formed with a central opening 13B and a transparent cap member 14 is detachably fitted with the opening 13B.

The receptacle 10, the cover member 13, the cap member 14 and the agitating blades 15 are preferably made of a plastic resin material.

In operation, the double-walled vessel 1 preliminarily refrigerated is located on the rotatable table 11 located in the upper body member 10' which is connected to the lower body member 10" so as to connect the driving means to the rotatable table 11. Then, the cover member 13 having the agitating blades 15 secured thereto is mounted on the upper end of the upper body member 10' so that the agitating blades 15 are inserted into the inner vessel member 2 with the outer edges 15A, 15B each of the blades 15 slidably contacting with the inner surface thereof. Then, the motor 20 is energized through a switch (not shown) by an electric power source also not shown so that the rotatable table 11 is rotated together with the double-walled vessel 1 supported thereon. Thereafter, an appropriate amount of the material for making frozen confections is charged in the inner vessel member 2 by removing the cap member 14 for charging the material through the opening 13B and, then, the cap member 14 is fitted with the opening 13B.

The reason why the motor 20 is energized before the material is charged in the inner vessel member 2 is for positively prevent the material which is being refrigerated by the cold keeping agent 4 from firmly striking to the inner surface of the inner vessel member 2 so as to prevent the torque of the motor 20 required for rotating the table 11 from excessively increasing to render the rotation of the motor 20 to be impossible. By virtue of the fact that the blades 15 are stationarily held and slidably contacting with the inner surface of the inner vessel member 2 relatively rotated with respect to the blades 15, the blades 15 can positively sweep away the material contacting with the inner surface of the inner vessel member 2. The material is agitated during the rotation of the double-walled vessel 1 until the frozen confections are completed.

The material being frozen in the inner vessel member 2 can be observed through the transparent cap member 14 for the inspection of the material being frozen, while the completed frozen confections can be taken out through the opening 13B by removing the cap member 14 thereby greatly facilitating the manipulation of the device.

As described above, the device of the present invention has superior effectiveness as follows:

(1) Since the double-walled vessel 1 is rotated while the agitating blades 15 are held stationarily, the construction of the cover member is made simple and the appearance thereof is improved, while the manipulation of the device is facilitated, because it is merely necessary to locate the double-walled vessel 1 on the table 11.

(2) Since the driving means for rotating the rotatable table 11 has a relatively heavy weight and located at the lower side of the receptacle 1, the device is stable during the operation.

(3) The charging of the material and the removal of the completed frozen confections are facilitated by the provision of a detachable transparent cap member 14, while the observation of the material being frozen in the inner vessel member 2 through the transparent cap member 14 is made possible.

(4) Since the receptacle 1 is of the split type, cleaning of the upper body member 10' and the storage both of the body members 10', 10" are facilitated.

What is claimed is:

1. Device for making frozen confections, such as ice cream, comprising:
   a double walled cylindrical vessel, comprising an inner vessel member and an outer vessel member, a space is defined between the inner vessel member and the outer vessel member which is sealed and is provided with a freezable cold keeping agent;
   an outer receptacle defining a receiving space is adapted and constructed to receive the cylindrical vessel therein;
   at least one agitating blade extending into the cylindrical vessel; and
   a rotating means, operatively coupled to the cylindrical vessel, for rotating the cylindrical vessel
   whereby food mixtures deposited into the cylindrical vessel are agitated and stirred by the rotation of the cylindrical vessel by the rotation means relative to the agitiating blade.

2. A device for making frozen confections as defined by claim 1 further comprising a cover member for closing the cylindrical vessel.

3. A device for making frozen confections as defined by claim 2 comprising a plurality of agitating blades that are mounted to the cover member and extend into the cylindrical vessel in sliding contact with the inner vessel member.

4. A device for making frozen confections as defined by claim 3 wherein the cover member is detachably mounted to the outer receptacle which is adapted and constructed to remain stationary during rotation of the cylindrical vessel by the rotating means.

5. A device for making frozen confections as defined by claim 4 wherein the rotating means comprises an electric motor.

6. A device for making frozen confections as defined by claim 5 wherein the rotating means comprises a rotating table on which is detachably mounted to the cylindrical vessel.

7. A device for making frozen confections as defined by claim 6 wherein the rotating table is cup-shaped and provided with at least one inwardly extending projection which is received in a recess located in the outer vessel member, thereby providing a means for rotatingly coupling the vessel to the rotating table.

8. A device as defined by claim 7 wherein said vessel is provided with a closed bottom which together with the inner vessel member and the outer vessel member form the space which is hermetically sealed and includes and annular space and a bottom space.

9. A device as defined by claim 8 wherein the cover member is provided with a transparent window so that a food mixture placed in the vessel can be observed.

10. A device as defined by claim 9 wherein the cover member is provided with at least one downward extending projection which engages a recess formed in the receptacle for rotationally coupling the cover member to the receptacle.

11. A device as defined by claim 10 wherein the receptacle defines two separate vertical compartments having a partition extending there across, the first compartment housing the electric motor and the second compartment housing the rotating table on which the vessel is detachably mounted.

12. A device as defined by claim 11 wherein the electric motor is provided with a reduction gear for transmitting rotational motion to the rotating table.

* * * * *